United States Patent
Corl, Jr. et al.

(10) Patent No.: US 6,473,763 B1
(45) Date of Patent: Oct. 29, 2002

(54) SYSTEM, METHOD AND COMPUTER PROGRAM FOR FILTERING MULTI-ACTION RULE SET

(75) Inventors: Everett Arthur Corl, Jr., Raleigh; Clark Debs Jeffries, Durham; Colin Beaton Verrilli, Apex, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/540,921

(22) Filed: Mar. 31, 2000

(51) Int. Cl.[7] .............................................. G06F 17/30
(52) U.S. Cl. ...................................... 707/101; 707/102
(58) Field of Search ................................ 707/1, 2, 3, 5, 707/100, 102, 101; 376/401; 709/203, 218, 225, 238, 239; 712/235; 714/26, 758

(56) References Cited

U.S. PATENT DOCUMENTS

| | | | |
|---|---|---|---|
| 4,677,550 A | | 6/1987 | Ferguson ........................ 707/3 |
| 5,546,390 A | * | 8/1996 | Stone .......................... 370/408 |
| 5,546,571 A | | 8/1996 | Shan et al. ..................... 707/3 |
| 5,551,027 A | | 8/1996 | Choy et al. .................. 707/201 |
| 5,574,910 A | * | 11/1996 | Bialkowski et al. ............ 707/1 |
| 5,664,172 A | | 9/1997 | Antoshenkov ................. 707/4 |
| 5,742,806 A | | 4/1998 | Reiner et al. ................... 707/3 |
| 5,951,649 A | * | 9/1999 | Dobbins et al. ............ 370/351 |
| 6,298,340 B1 | * | 10/2001 | Calvignac et al. ............. 707/1 |

* cited by examiner

Primary Examiner—Diane D. Mizrahi
Assistant Examiner—A. Mofiz
(74) Attorney, Agent, or Firm—Sawyer Law Group; Janyce R. Mitchell

(57) ABSTRACT

A method and system for testing a plurality of filter rules in a computer system is disclosed. The plurality of filter rules is used with a key. Each of the plurality of filter rules is capable of being described using a plurality of bits corresponding to a portion of the key. The plurality of bits can include at least one binary value, at least one wildcard, and at least one boundary symbol. The at least one binary value can be a zero or a one. The method and system include selecting a portion of the plurality of filter rules that the key can match by testing part of the key against a portion of the plurality of bits and explicitly testing the key against the portion of the plurality of filter rules. A first bit of the portion of the plurality of bits has a first maximum number of the at least one binary symbol for the plurality of filter rules. Each subsequent bit of the portion plurality of bits has a second maximum number of the at least one binary symbol for a plurality of remaining bits and is selected based on testing of a prior bit. Preferably, the portion of the plurality of bits is tested using a decision tree which includes nodes corresponding to a second portion of the plurality of bits.

45 Claims, 9 Drawing Sheets

100

102

Select Portion of the Filter Rules the Key can Match by Testing the Key Agasint Selected Bits Determined by Bits Having the Minimum Number of Wildcards and Boundary Symbols for the Filter Rules and by Test of Key Against Previous Selected Bits

104

Explicitly Test Key Against Rule(s) in the Portion of the Filter Rules

SYSTEM, METHOD AND COMPUTER PROGRAM FOR FILTERING MULTI-ACTION RULE SET

CROSS-REFERENCE TO RELATED APPLICATIONS

The present invention is related to co-pending and pending U.S. patent application Ser. No. 09/540,333 and entitled "SYSTEM METHOD AND COMPUTER PROGRAM FOR PRIORITIZING FILTER RULES" and assigned to the assignee of the present invention. The present invention is also related to U.S. patent application Ser. No. 09/312,148, now U.S. Pat. No. 6,298,340 and entitled "SYSTEM METHOD AND COMPUTER PROGRAM FOR FILTERING USING TREE STRUCTURE" and assigned to the assignee of the present invention. The present invention is also related to co-pending and pending U.S. patent application Ser. No. 09/477,578 and entitled "METHOD AND SYSTEM in FOR PERFORMING INTERVAL-BASED TESTING OF FILTER RULES" and assigned to the assignee of the present invention.

FIELD OF THE INVENTION

The present invention relates to computer systems, and more particularly to a method and system for more efficiently testing filter rules.

BACKGROUND OF THE INVENTION

FIG. 1 depicts conventional networks 10 and 20 which may be connected to the Internet 30. Each network 10 and 20 includes host 12, 14 and 16 and 22 and 24, respectively. Each network 10 and 20 also includes a switch 18 and 26, respectively, and may include one or more servers such as the servers 17, 19 and 28, respectively. In addition, each network 10 and 20 may include one or more gateways 13 and 25, respectively, to the Internet 30. Not explicitly shown are routers and other portions of the networks 10 and 20 which may also control traffic through the networks 10 and 20 and which will be considered to be inherently depicted by the switches 18 and 26, respectively, and the networks 10 and 20 in general.

In order to manage communications in a network, such as the network 10 or 20, filter rules are used. Filter rules are typically employed by switches of the network. A filter rule tests packets which are being transmitted via a network in order to provide a variety of services. A filter rule may test packets entering the network from an outside source to ensure that attempts to break into the network can be thwarted. For example, traffic from the Internet 30 entering the network 10 may be tested in order to ensure that packets from unauthorized sources are denied entrance. Similarly, packets from one portion of a network may be prevented from accessing another portion of the network. For example, a packet from some of the hosts 12, 14 or 16 may be prevented access to either the server 17 or the server 19. The fact that the host attempted to contact the server may also be recorded so that appropriate action can be taken by the owner of the network. Filter rules may also be used to transmit traffic based on the priorities of packets. For example, packets from a particular host, such as the host 12, may be transmitted because the packets have higher priority even when packets from the hosts 14 or 16 may be dropped. Filter rules may also be used to ensure that new sessions are not permitted to be started when congestion is high even though traffic from established sessions is transmitted. Other functions could be achieved based on the filter rule. Filter rules can also interact, based on the priority for the filter rule. For example, a first filter rule may be a default filter rule, which treats most cases. A second filter rule can be an exception the first filter rule. The second filter rule would typically have a higher priority than the first filter rule to ensure that where a packet matches both the first and the second filter rule, the second filter rule will control.

Filter rules test a key in order to determine whether the filter rule will operate on a particular packet. The key that is typically used is the Internet Protocol (IP) five-tuple of the packet. The IP five-tuple typically contains five fields of interest: the source address, the destination address, the source port, the destination port and the protocol. These fields are typically thirty-two bits, thirty-two bits, sixteen bits, sixteen bits and eight bits, respectively. Thus, the part of IP five-tuple of interest is typically one hundred and four bits in length. Filter rules typically utilize these one hundred and four bits, and possible more bits, in order to perform their functions. For example, based on the source and destination addresses, the filter rule may determine whether a packet from a particular host is allowed to reach a particular destination address.

Furthermore, the key often contains additional bits other than the fields of the IP five-tuple. For example, a TCP SYN (start of session) packet, which starts a session, may be characterized differently than a TCP packet for an existing session. This characterization is accomplished using bits in addition to those in the IP five-tuple. The additional bits may be used by a filter rule which manages traffic through a network. For example, when the network is congested, the filter rule may proactively drop the TCP SYN packet while transmitting TCP packets for existing sessions. These operations allow the network to continue to operate and help reduce congestion. In order to perform this function, however, the filter rule utilizes a SYN packet or the additional bits which characterize a packet as a start packet or a packet from an existing session. Thus, the filter rules typically operate using a key that includes at least some fields of the IP five-tuple of a packet and may include additional bits.

In order to manage traffic over a network, such as the network 10, multiple filter rules are typically used. In addition, different types of filter rules may be used. The type of the filter rule is determined by the type of action which a filter rule may take if a key matches the filter rule. For example, one type of action may be permit or deny. Based on the key, such a filter rule determines whether to permit or deny access of a particular packet to a portion of the network. Another type of action may be a quality of service. For example, the network may provide five levels of service. When the key matches a filter rule of this type, the quality of service for the packet is is determined to be one of the five possible levels of service. Yet another type of filter rule may be to tag or not tag a particular packet. Thus, based on whether the key for a packet matches a filter rule of this type, a bit may be set in an extended key or the packet five-tuple. Within each type of filter rule, different filter rules may also have different priorities. Thus, if a key matches more than one filter rule in a particular type, the action(s) to be taken can be determined based on the priorities of the filter rules matched.

Each of the filter rules, regardless of type, typically utilizes one of two criteria for testing keys. One category of filter rule utilizes an exact match. The filter rule operates on a packet if the key or a field of the key for the packet exactly matches the criteria for the filter rule. If no exact match exists, then the filter rule is not invoked. Such a filter rule is relatively easy to test keys against.

The second category of filter rule utilizes one or more ranges of values against which a key is tested. One criterion for such a filter rule is typically a range of values for a field of a key. For example, if a key utilizes the IP five-tuple, the criteria for the filter rule would typically include a range of values for one or more of the five fields of the IP five-tuple. The values for each of the fields are determined by converting the bits in a field to a binary number. For example, the thirty-two bit source address field can be converted into an integer between zero (all bits of the thirty-two bit binary number are zeroes) and over four billion (all thirty-two bits of the binary number are ones). The filter rule is tested by determining whether keys for incoming packets have values that are within the ranges for the appropriate field.

A particular filter rule may use an exact match for each field of a key, may use ranges for each field of a key, or may use some combination of the two. The filter rule is tested by determining whether the key meets the criteria of the filter rule for each field. Where a filter rule uses a range of values as a criterion for the field, that portion of the filter rule is tested by determining whether the corresponding field of the key fits within the range of values. Where a filter rule requires an exact match for a field, that portion of the filter rule is tested by determining whether the corresponding field of the key exactly matches the value of the filter rule.

A set of filter rules used in a system may include interval-based filter rules and may include multiple types of filter rules having differing priorities. One of ordinary skill in the art will readily recognize that such a set of filter rules is difficult to test. Typically, each filter rule in the set is tested against the key. The filter rules are also typically tested in order, based on the priorities of the filter rules. Furthermore, filter rules of each type are tested. Explicitly testing such a large number of filter rules may be expensive and time-consuming. Furthermore, interval-based filter rules are tested against a particular key by determining whether the field of the key is within the corresponding range of values for that field. The range of values for the field may be quite large. In order to explicitly test the key against this range of values, a structure which consumes a relatively large amount of memory must be built. In addition, such a test often requires a relatively large amount of time to complete. Thus, such a filter rule is expensive both in terms of time and memory. It is, therefore, expensive to test a number filter rules which may have different types, may have different priorities and which may be interval-based.

Accordingly, what is needed is a system and method for testing filter rules which may be of different types and which utilize ranges of values for criteria. The present invention addresses such a need.

SUMMARY OF THE INVENTION

The present invention provides a method and system for testing a plurality of filter rules in a computer system. The plurality of filter rules is used with a key. Each of the plurality of filter rules is capable of being described using a plurality of symbols corresponding to a portion of the key. The plurality of bits can include at least one binary value, at least one wildcard, and at least one boundary symbol. The at least one binary value can be a zero or a one. The method and system comprise selecting a portion of the plurality of filter rules that the key can match by testing part of the key against a portion of the plurality of bits and explicitly testing the key against the portion of the plurality of filter rules. A first bit of the portion of the plurality of bits has a first maximum number of the at least one binary symbol for the plurality of filter rules. Each subsequent bit of the portion plurality of bits has a second maximum number of the at least one binary symbol for a plurality of remaining bits and is selected based on testing of a prior bit. Preferably, the portion of the plurality of bits is tested using a decision tree which includes nodes corresponding to a second portion of the plurality of bits.

According to the system and method disclosed herein, the present invention provides testing of filter rules, particularly filter rules of different types, which requires less information and is faster and simpler to implement.

DETAILED DESCRIPTION OF THE INVENTION

The present invention relates to an improvement in computer systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Figure 1:
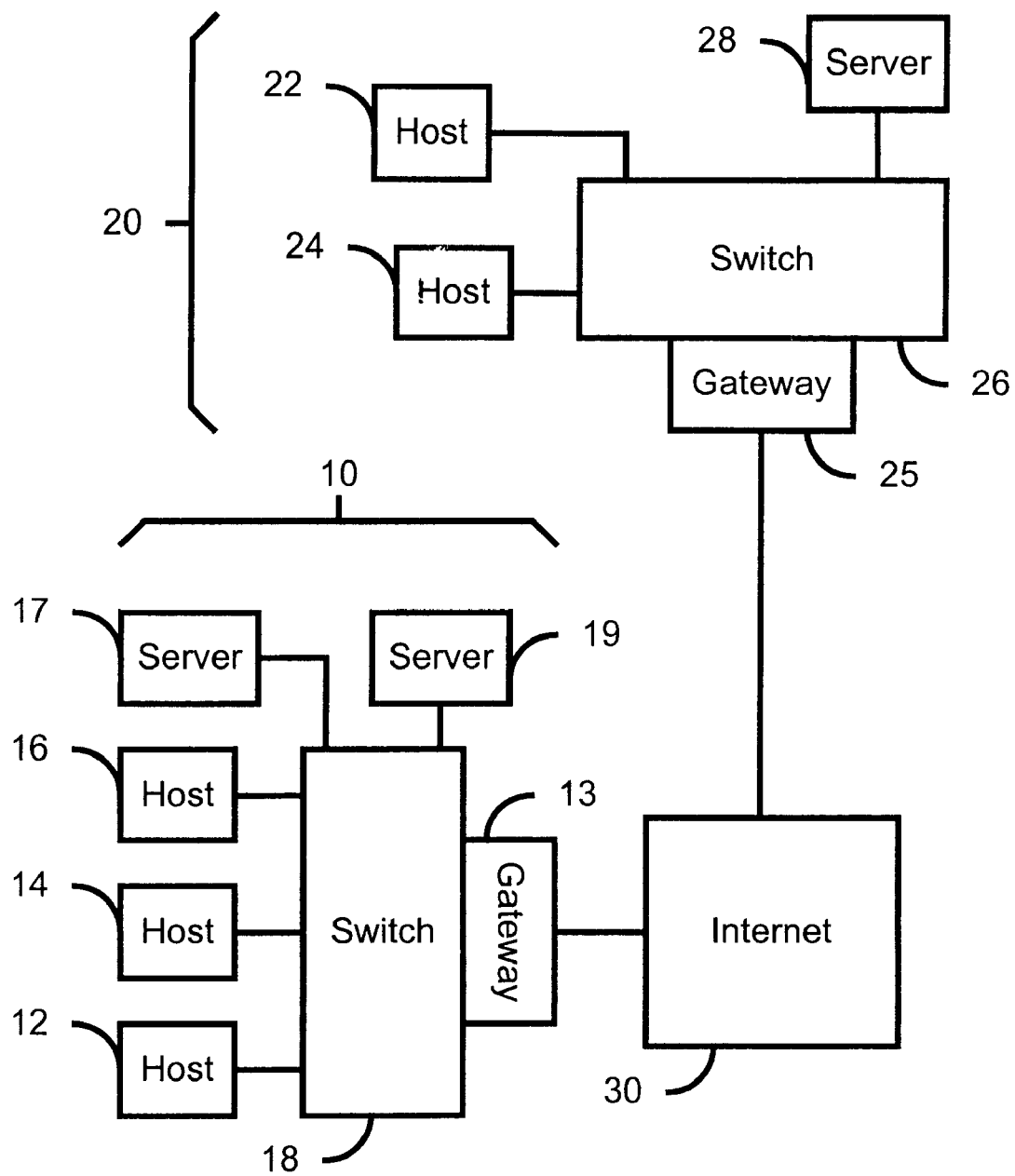
FIG. 1 is a diagram of conventional networks.

Computer networks, such as the networks 10 and 20 depicted in FIG. 1, utilize filter rules for controlling the flow of traffic. Based on whether the key for a packet falls within a filter rule, the filter rule may require some action to be taken. The type of action taken depends upon the type of the filter rule. For example, a packet may be dropped, denied access to a particular portion of the network 10 or 20, denied access to the outside, for example via a gateway to the Internet 30, or have a set quality of service. These actions determine the type of a filter rule. In addition to having different types, filter rules may have different priorities. When a key matches two filter rules of the same type, the higher priority filter rule is enforced.

Filter rules are also often based on ranges of values. Portions, or fields, of a key may be converted into an integer. For example, a key typically used is constructed from bits in the IP five-tuple for a packet. The IP five-tuple typically includes from the IP and TCP headers the following five fields: source address (thirty-two bits), destination address (thirty-two bits), source port (sixteen bits), destination port (sixteen bits) and protocol (eight bits). Each field can be considered to represent a binary number. A filter rule may test packets to determine whether one or more of the fields falls into a range of values. For example, source addresses below the binary number 1024 or 2048 are typically reserved by system administrators for particular functions. Thus, a filter rule may test a source address field to determine whether the address is above the binary number 00000000000000000000010000000000 when the number of interest is 1024. The range for such a filter rule would be 1024 to the maximum possible or 2048 to the maximum possible. Thus, ranges allow a filter rule to be relatively flexible and cover a range of cases. However, a filter rule can also require an exact match, which may be represented by a single binary number. Thus, such a filter rule determines whether a portion of the key exactly matches the binary number.

Typically, filter rules are tested by comparing each key to the range for each field of each filter rule. Filter rules are typically tested in order of priority, from highest to lowest priority. Furthermore, filter rules of different types are tested to ensure that all of the appropriate actions are taken. When a key falls within all of the appropriate ranges, the filter rule may require some action to be taken for the packet to which the key corresponds. Note, however, that if the key falls within two filter rules with contradictory actions to enforce (such as "permit" and "deny"), the higher priority filter rule is enforced.

Although testing a key against each filter rule allows the filter rules of different types and different priorities to function, one of ordinary skill in the art will readily realize that the method is time consuming and costly. There may be a large number of filter rules of different types to be tested, which consumes a great deal of time. Some or all of the filter rules may also use a large range of values a particular field or fields. Explicitly testing such large ranges may be slow. Consequently, conventional testing of filter rules is time-consuming.

The present invention provides a method and system for testing a plurality of filter rules in a computer system. The plurality of filter rules is used with a key. Each of the plurality of filter rules is capable of being described using a plurality of bits corresponding to a portion of the key. The plurality of bits can include at least one binary value, at least one wildcard, and at least one boundary symbol. The at least one binary value can be a zero or a one. The method and system comprise selecting a portion of the plurality of filter rules that the key can match by testing part of the key against a portion of the plurality of bits and explicitly testing the key against the portion of the plurality of filter rules. A first bit of the portion of the plurality of bits has a first maximum number of the at least one binary symbol for the plurality of filter rules. Each subsequent bit of the portion plurality of bits has a second maximum number of the at least one binary symbol for a plurality of remaining bits and is selected based on testing of a prior bit. Preferably, the portion of the plurality of bits is tested using a decision tree which includes nodes corresponding to a second portion of the plurality of bits.

The present invention will be described in terms of a particular set of filter rules having certain ranges and being of particular types. However, one of ordinary skill in the art will readily recognize that this method and system will operate effectively for other filter rules using other ranges. The present invention will also be described in the context of filter rules that are represented by a single number. However, one of ordinary skill in the art will readily realize that the method and system function analogously for a filter rule which is represented by numbers for more than one field. In such a case, the present invention may operate for each number for each field. One of ordinary skill in the art will also readily recognize that the method and system operate effectively for filter rules which use a combination of exact matches and ranges of values. Furthermore, although described in the context of a switch which controls traffic over a network, the present invention can function in other environments in which filter rules are used.

Figure 2:
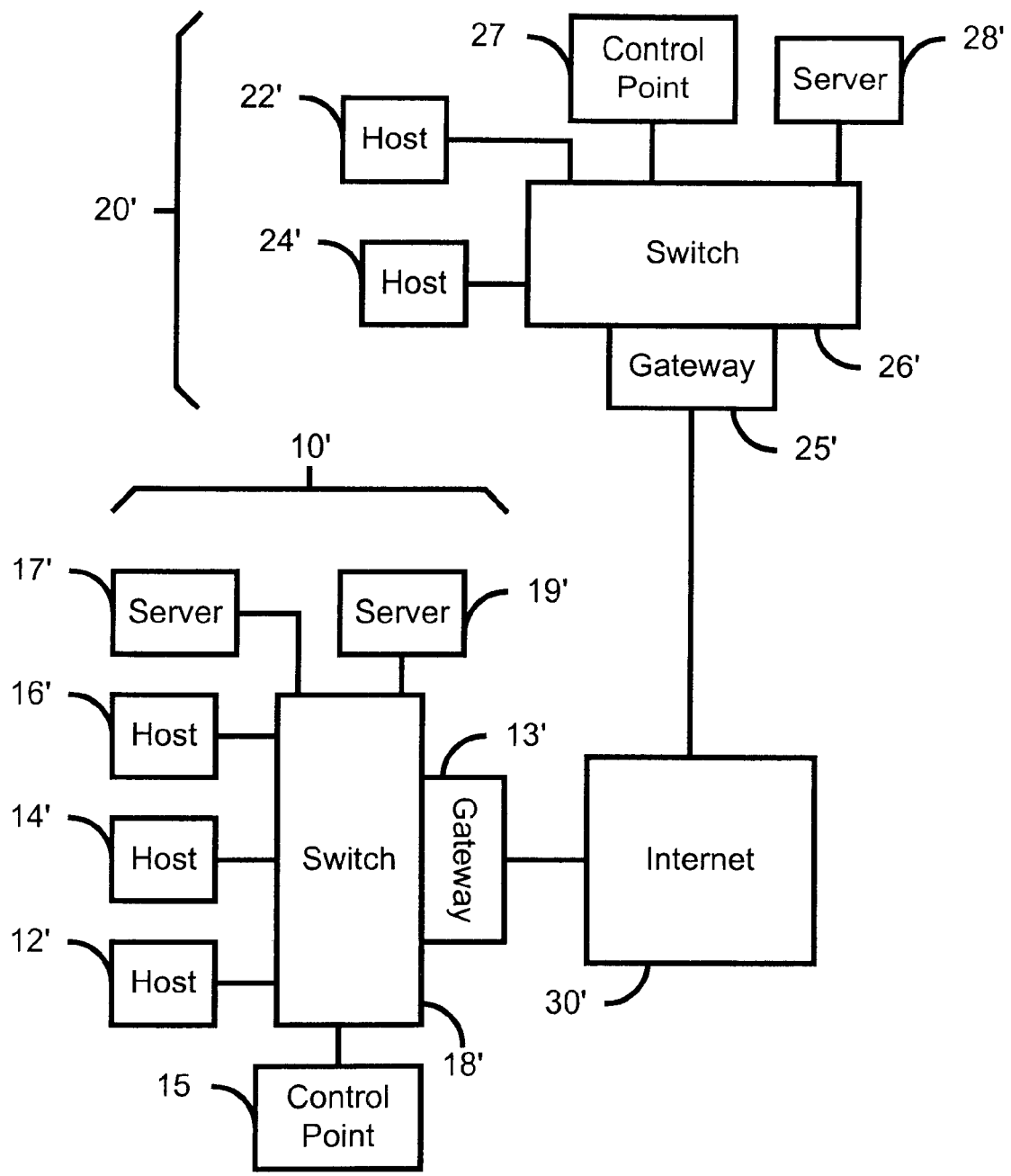
FIG. 2 is a diagram of networks in which the present invention can be used.

To more particularly illustrate the method and system in accordance with the present invention, refer now to FIG. 2, depicting preferred embodiments networks 20' and 10' with which the present invention may be used. The networks 10' and 20' are substantially the same as the networks 10 and 20 depicted in FIG. 1. However, also shown are control points 15 and 27. The control points 15 and 27 are preferably general purpose computers coupled with switches 18' and 26'. The control points 15 and 27 preferably perform functions relating matrices and selection of bits to be used in testing filter rules, as discussed below. The switches 18' and 26' preferably include the software managed decision trees (not shown in FIG. 2), as discussed below, and determine whether a key matches one or more of the filter rules using the decision trees.

Figure 3:
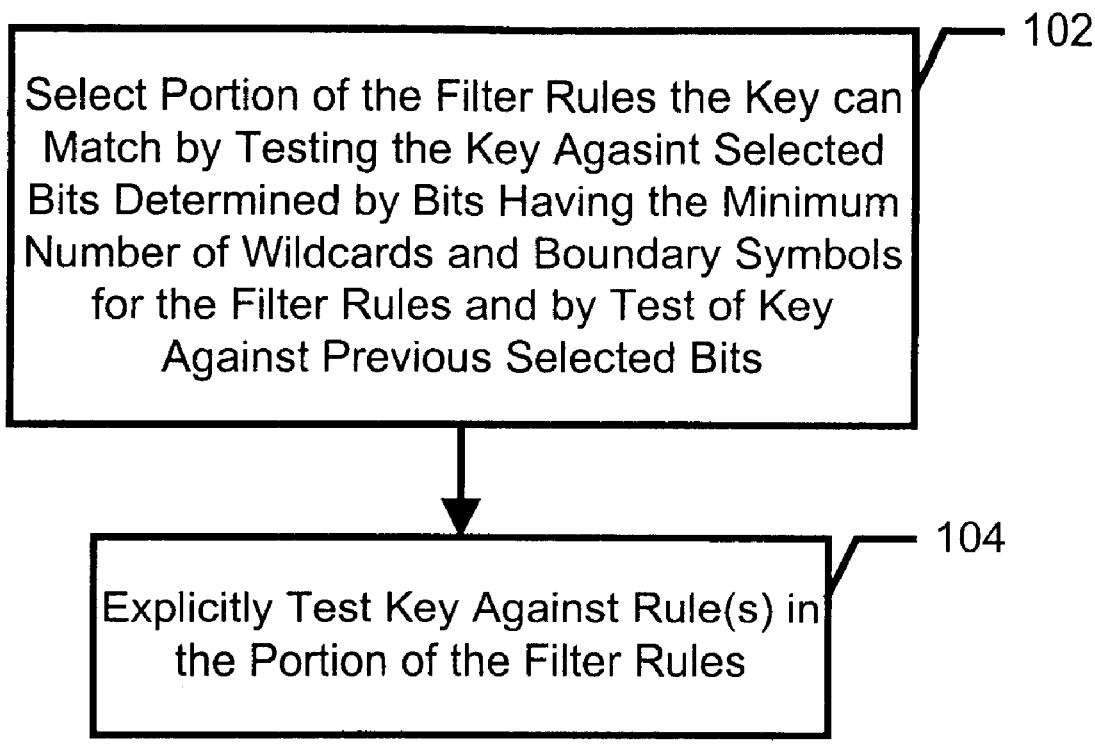
FIG. 3 is a high-level flow chart of a method for testing filter rules having different types in accordance with the present invention.

To more particularly describe the present invention, refer to FIG. 3, depicting one embodiment of a method 100 for testing filter rules in accordance with the present invention. The method 100 is preferably used in conjunction with filter rules that can have different types and that may use ranges of values for criteria for testing a key. A filter rule may use a range of values for one or more fields of a key. For example, where the IP five-tuple is used as a key, the filter rule may use a range of values for one or more of the source address, destination address, source port, destination port and protocol fields. Each field of a key can be viewed as a different dimension in an n dimension space, where n is the number of fields. Consequently, the filter rules may use a range of values for one or more dimensions.

Thus, each filter rule may be described by a number in a particular field or fields. The number includes a number of bits which are preferably a binary symbol (e.g. 0 or 1), a wildcard (*), or a boundary symbol (b). A binary symbol indicates that the bit for the filter rule is a specific binary value and that the corresponding bit in the key must be the same specific number. For example, a zero can be a binary symbol for a particular bit of a filter rule. This indicates that in order to match the filter rule, this bit of the key must also be a zero. A wildcard indicates that the bit of the filter rule can be either a zero or a one. For example, a filter rule may have a range of [256,511]. Such a filter rule can be represented as a single binary number having binary symbols (zeroes and ones), as well as wildcards. The binary number representing such a filter rule is 000000000000000000000001********. This is because the eight least significant bits of the range for such a filter rule can be either zero or one. Thus, a key must have exactly the same most significant twenty-four bits as the filter rule, but can have any binary number for the least significant bits in order to match the filter rule. A boundary symbol indicates that the boundary of the range for the particular filter rule is irregular. For example, another filter rule may have a range of [6,53]. The binary number representing the lower endpoint is 00000110, while the binary number representing the upper endpoint is 00110101. Such a filter rule can be represented with the number 00bbbbbb because all values between 00000000 and 00111111 are not included in the range. Such a representation is used because the last five bits of the number representing the filter rule do not vary simply between the endpoints.

In a preferred embodiment, the method 100 is used after the method described in co-pending U.S. patent application Ser. No. 09/312,148 now U.S. Pat. No. 6,298,340 and entitled "SYSTEM METHOD AND COMPUTER PROGRAM FOR FILTERING USING TREE STRUCTURE" and assigned to the assignee of the present invention. Applicants hereby incorporate by reference the above-mentioned co-pending patent application. In the above-mentioned co-pending application, filter rules are separated into groups of one or more filter rules, preferably using a decision tree. The method and system described in the above-mentioned co-pending application provides the decision tree using one of several related metrics. In so doing, certain bits, called choice bits in the above-mentioned co-pending application, are selected for testing. The algorithm described in the above-mentioned co-pending application is called the "choice bit" algorithm.

In the choice bit algorithm, the filter rules are typically provided by a user of the system, such as a network administrator. All filter rules used in a system are preferably arranged by the choice bit algorithm to make up the rows of a matrix. As discussed above, the filter rules can be described by a number of bits. Therefore, a column of the matrix includes a bit for each of the filter rules. A column of the matrix can be described by four variables, a0, a1, a* and ab. The variable a0 is the number of zeroes occurring in the column. The variable a1 is the number of ones occurring in the column. The variable a* is the number of wildcards occurring in the column. The variable ab is the number of boundary symbols occurring in the column. The choice bit algorithm is used as long as one or more of the columns contains both zeroes and ones.

The choice bit algorithm preferably attempts to select rows which having a minimum number of boundary symbols and wild cards and having close to the same number of zeroes and ones. Assuming that there are N filter rules, the choice bit algorithm preferably seeks a column with a* and ab being minimized and a0 and a1 being as close as possible to N/2. For example, the choice bit algorithm preferably minimizes the quantity $(a0-N/2)^2+(a1-N/2)^2+(a*+ab)^2$ in order to select the column. The column selected corresponds to a choice bit, a bit which can be tested. The bit is preferably used in a decision tree to check to see if the key matches some of the filter rules. Based on the column selected, two submatrices are formed. One submatrix includes the rows of the original matrix (the filter rules) which do not have a zero in the column selected. The second submatrix includes the rows of the original matrix (the filter rules) which do not have a one in the column selected. The choice bit algorithm is then applied to the remaining submatrices. Based on the algorithm subsequent bits are chosen. The choice bit algorithm can continue to be applied as long as a column in a submatrix includes both zeroes and ones. When none of the columns in a submatrix includes both zeros and ones, the choice bit algorithm is no longer applied.

The bits selected using the choice bit algorithm are used to build a decision tree. A particular node chain of the decision tree includes some number of the bits selected using the choice bit algorithm and terminates in a leaf corresponding to one or more filter rules which a key can match. Therefore, the decision tree can be used in isolating one or more filter rules that a key for a particular packet can match.

Although the choice bit algorithm functions well for its intended purpose, the decision tree obtained using the choice bit algorithm does not distinguish between certain filter rules. In particular, the choice bit algorithm does not distinguish between filter rules in a set of filter rules which have no columns with both zeroes and ones. Thus, if all of the filter rules used in a particular system fit this criterion the choice bit algorithm is not successful in reducing the amount of testing required. Similarly, if a number of filter rules fitting this criterion remain after application of the choice bit algorithm, the choice bit algorithm is not used to further distinguish between the filter rules.

The method 100 is also preferably performed using a switch 18' or 26' depicted in FIG. 2. Referring back to FIG. 3, the method 100 preferably commences when the choice bit algorithm is no longer applied or cannot be applied to a plurality of filter rules. Thus, the method 100 depicted in FIG. 3 preferably commences when the filter rules, either remaining to be distinguished or provided by the user, are such that a matrix formed with the filter rules as rows has no column containing both zeroes and ones. However, the filter rules can still be described using some combination of binary symbols (e.g. 0 or 1), wildcards (*) and boundary symbols (b). Also in a preferred embodiment, the method 100 is utilized when there is a relatively large number of filter rules to be distinguished. For example, the method 100 may be used when there are several filter rules which cannot be distinguished using the choice bit algorithm, but might not be used when there are only two or three filter rules to be distinguished. When the method 100 is not used, then the filter rules are preferably tested explicitly. Thus, in this case the filter rules would be tested in order of priority to determine whether the key exactly matches the criteria of the filter rules.

A portion of the plurality of filter rules that the key can match is selected, via step 102. Thus, step 102 preferably narrows the possible number of filter rules which a key can match. The portion of the plurality of filter rules is selected in step 102 using a portion of the key. Thus, step 102 tests certain bits of the key against corresponding bits of the filter rules. Depending upon the outcome of the test of a particular bit of the key, another bit of the key and the corresponding bit of the filter rule are tested against each other. This process continues until the key has been determined to match some portion of the plurality of filter rules. The bits against which the key is tested are also determined based on the properties of the plurality of filter rules against which the key is desired to be tested. Preferably, the bits against which a portion of the key might be tested are determined based on the number of binary symbols (zeroes and ones), the number of wildcards and the number of boundary symbols which occur for a particular bit in the numbers describing the plurality of filter rules. For example, the first bit against which a bit of the key is tested is possibly a bit for which the filter rules have the minimum number of wildcards and boundary symbols. Thus, the first bit is also possibly the bit which has the maximum number of binary symbols. Subsequent bits against which the key is tested are determined based on a bit of the remaining bits for which some remaining portion of the filter rules have the minimum number of wildcards and boundary symbols and based on the resultant of the test of the previous bit. In a preferred embodiment, the testing of particular bits of the filter rules against corresponding bits of the key in step 102 are determined using a decision tree, which is preferably a a hardware assist or co-processor residing binary decision tree.

Once the portion of the plurality of rules is determined, the key may be explicitly tested against each key of the portion of the plurality of filter rules, via step 104. Thus, the filter rules which the key might match may be narrowed in step 102. The key is then explicitly tested against the portion of the plurality of filter rules, via step 104. Thus, the filter rules which the key may match can be explicitly determined.

Thus, the number of filter rules which the key may match can be greatly narrowed using step 102. The number of filter rules against which the key is explicitly tested in step 104 may be greatly reduced. As a result, less time is consumed in testing a key for a particular packet. Furthermore, although the method 100 has been described in the context of filter rules being described by a combination of binary symbols, boundary symbols and wildcards, one of ordinary skill in the art will readily realize that a particular field of the filter rules may be described by the above-mentioned combination of bits. Thus, the method 100 may be used for testing a plurality of filter rules against a single field of a key, such as the source address of an IP five-tuple packet. The method 100 may also be repeated for other fields of the key and the filter rules.

As discussed above, the method 100 is preferably accomplished using a decision tree residing on the switch 18' or 26'. The decision tree has a plurality of nodes and a plurality of leaves. The nodes of the tree are preferably the bits of the filter rules, discussed above. Each leaf of the tree contains a portion of the plurality of rules. Depending upon the bits actually tested in step 102 and the filter rules against which the bits are tested, a different leaf may be reached and the portion of the plurality of rules determined.

Figure 4:
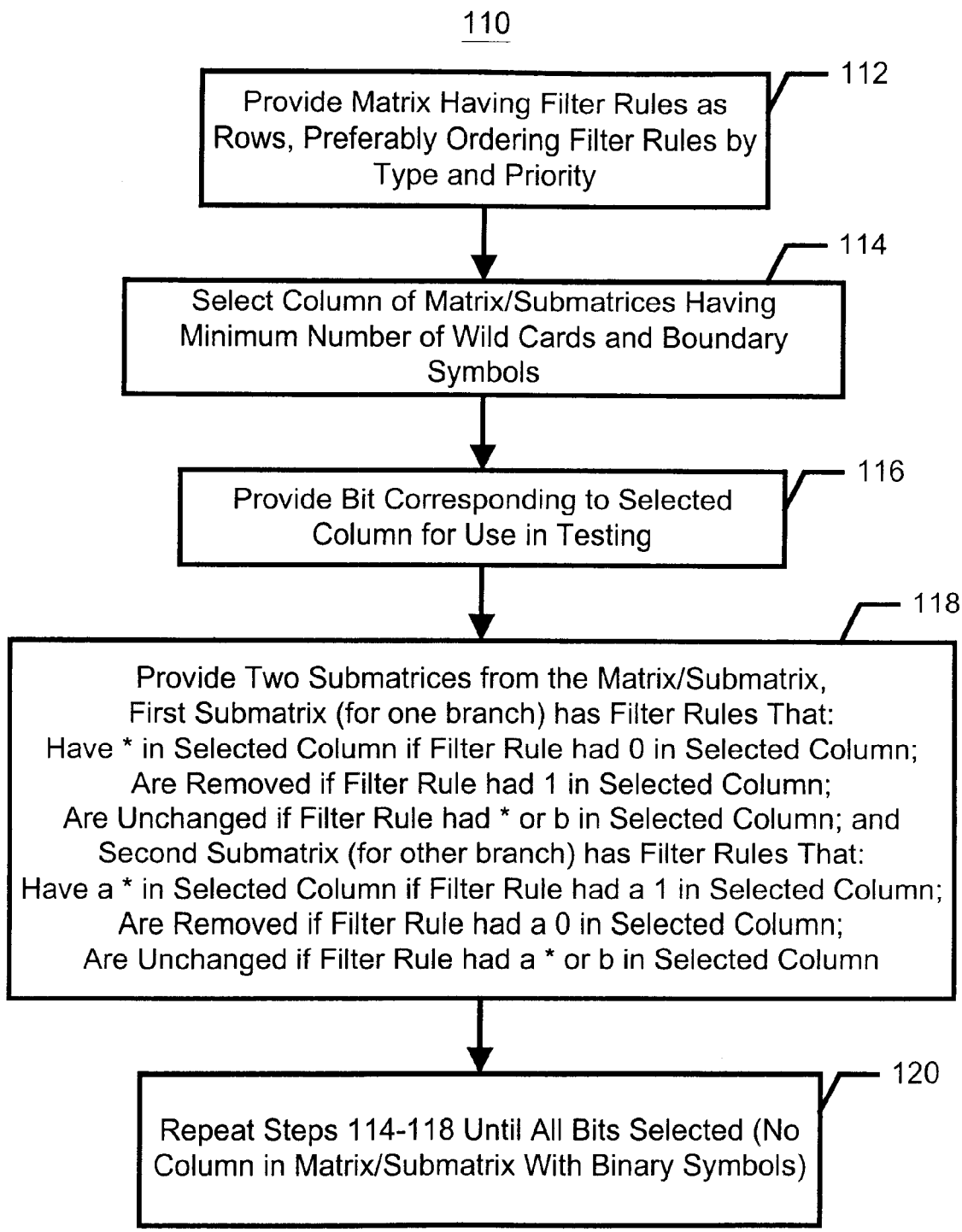
FIG. 4 is a more detailed flow chart of a method for providing a decision tree in accordance with the present invention.

FIG. 4 depicts one embodiment of a method 110 for determining the bits of the filter rules which might be used for testing the key in the method 100. Thus, the method 110 may also determine the nodes of the decision tree, if a decision tree is used. The method 110 is preferably performed by the control point 15 or 27. Throughout the description of the method 110, it is assumed that no low priority rule has as its domain a set of keys contained in the keys which fit a rule of higher priority. If that were allowed, then the lower priority rule would not be referenced, which is a logical error.

A first matrix for the plurality of filter rules is provided, via step 112. As discussed above, the plurality of filter rules are preferably those rules between which the choice bit algorithm does not distinguish. Thus, the plurality of filter rules can be all of the filter rules provided by the user or some subset of the filter rules provided by the user. If the plurality of filter rules is a subset of the filter rules provided by the user, then the filter rules are those which may exist on a leaf of a decision tree formed by using the choice bit algorithm. Therefore, a decision tree provided using the method 110 can be a separate decision tree or can be considered to be an extension of the decision tree formed using the choice bit algorithm. The plurality of filter rules is provided as the rows of a matrix in step 112. The columns of the matrix thus correspond to the bits which describe the filter rules. A row of the matrix preferably includes some combination of binary symbols, boundary symbols and wildcards. A column of the matrix preferably includes some combination of binary symbols, boundary symbols and wildcards. However, a column of the matrix may include either zeroes or ones, but not both. Step 112 also preferably includes arranging the filter rules based on the type of the filter rule and the priority of the filter rule. As discussed above, the type of the filter rule depends upon the action which is taken if the key matches the filter rule.

A column of the matrix is then selected, via step 114. The column selected determines the bit that can be used in testing the key. The column selected in step 114 is the column which has the minimum number of boundary symbols and wildcards or which has the maximum number of binary symbols, according to some metric. If more than one such column exists, the column having the lowest index number, or least significant bit, is preferably chosen. The bit corresponding to the selected column is provided for use in testing, via step 116. In a preferred embodiment, the bit is provided to the switch 18' or 26'. Preferably in step 116 the bit is also placed in the appropriate position in the decision tree being built.

Two submatrices are provided from the matrix, via step 118. The two submatrices are provided based on the entry each filter rule has in the selected column. The first submatrix includes a wildcard in the selected column for a filter rule having a zero in the selected column. The first submatrix does not include filter rules which have a one in the selected column. The first submatrix includes unchanged filter rules which have a wildcard or a boundary symbol in the selected column. Thus, the first submatrix is preferably used in providing the bits for branches from a node which are taken if the bit corresponding to the node is or might be a zero. The second submatrix includes a wildcard in the selected column for a filter rule having a one in the selected column. The second submatrix does not include filter rules which have a zero in the selected column. The second submatrix includes unchanged filter rules which have a wildcard or a boundary symbol in the selected column. Furthermore, duplicate rows may be eliminated from the first and second matrix. A filter having a lower priority which is the duplicate of a higher priority filter rule of the same action type can be removed if neither filter rule has a boundary symbol within it. Thus, the second submatrix is preferably used in providing the bits for branches from a node which are taken if the bit corresponding to the node is or might be a one.

The steps of selecting a column (step 114), providing the bit (step 116) and generating submatrices (step 118) are then repeated for the submatrices previously generated, via step 120. Step 120 repeats steps 114, 116 and 118 until none of the columns in the submatrices generated have a binary symbol, i.e. a zero or a one. Thus, the steps 114, 116 and 118 are repeated until all of the bits that can aid in isolating the portion of the plurality of rules using the method 100 have been found.

Using the method 110, the bits which can be used to test the key against are determined. In a preferred embodiment, the resultant of the method 110 is a binary decision tree which can be used to test certain bits of keys for packets. Also in a preferred embodiment, the resultant of the method 110 is a binary decision tree which can be used to test certain bits of keys for packets. As a result, the method 100 can be used to substantially reduce the time required to test filter rules. In addition, when the method 110 is performed by the control point 15 or 27, the switch 18' or 26' performs the rapid testing of the packet, while the control point 15 or 27 performs the more complex, slower calculations relating to the matrices.

As discussed with respect to the method 100, the method 110 has been described in the context of filter rules described by a combination of binary symbols, boundary symbols and wildcards. However, one of ordinary skill in the art will readily realize that a particular field of the filter rules may be described by the above-mentioned combination of bits. Thus, the method 110 may be used determining bits for use in testing a single field of a key, such as the source address of an IP five-tuple packet. The method 110 may also be repeated for other fields of the key and the filter rules.

Figure 5A:
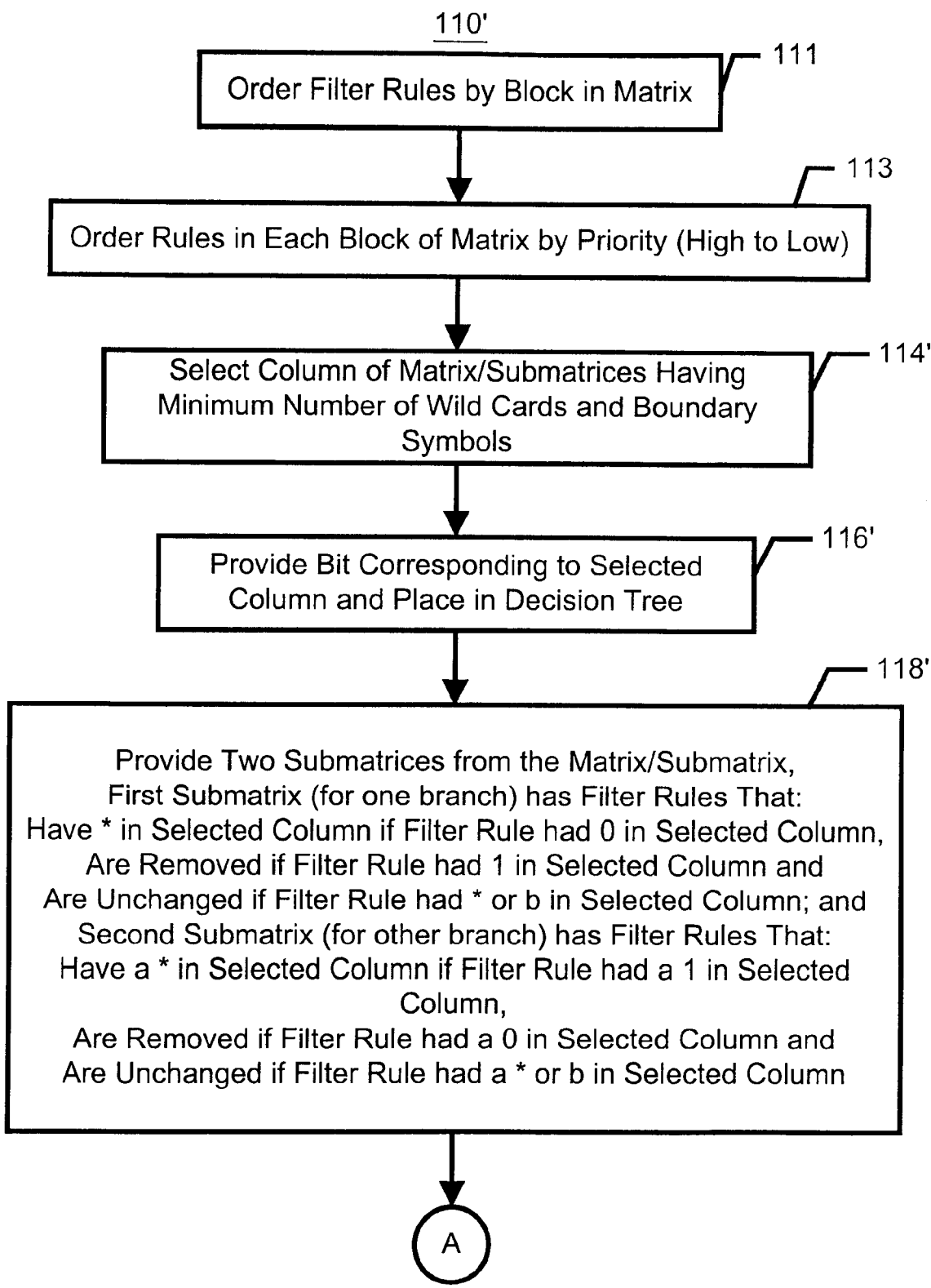
FIGS. 5A and 5B are a more detailed flow chart of a method for providing the decision tree in accordance with the present invention.
Figure 5B:
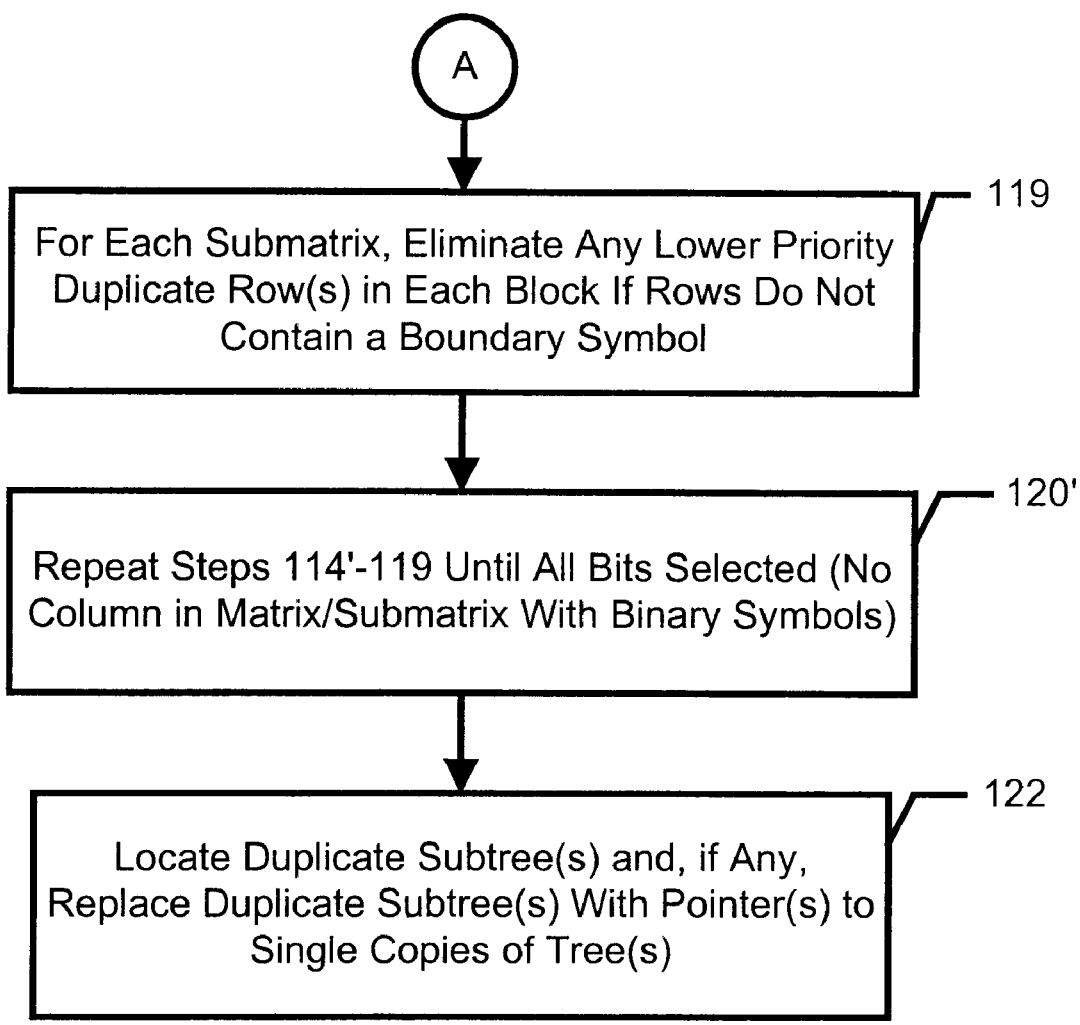

FIGS. 5A and 5B depict a more detailed diagram of a preferred embodiment of a method 110' for providing a decision tree in accordance with the present invention. The method 110' is substantially the same as the method 110. Thus, the method 110' is preferably used with the same filter rules as the method 110. As discussed with respect to the method 100, although the method 110' has been described in the context of filter rules being described by a combination of binary symbols, boundary symbols and wildcards, one of ordinary skill in the art will readily realize that a particular field of the filter rules may be described by the above-mentioned combination of bits. Thus, the method 110' may be used determining bits for use in testing a single field of a key, such as the source address of an IP five-tuple for the packet. The method 110' may also be repeated for other fields of the key and the filter rules.

The filter rules are arranged into blocks based on types, via step 111. A filter rule type is determined by the action taken when the key matches the filter rule. For example, all filter rules that act to permit or deny a packet access may be placed in one block. All filter rules that have to do with quality of service are placed in another block. The filter rules within each block are ordered based on their priority, from highest priority to lowest priority, via step 113. Thus, higher priority filter rules will be placed higher in the block which contains the filter rules. Consequently, steps 111 and 113 perform the function of step 112 in the method 110 depicted in FIG. 4.

Referring back to FIGS. 5A and 5B, a column of the matrix is then selected, via step 114'. The step 114' is substantially the same as step 114 of FIG. 4. Referring back to FIGS. 5A and 5B, the column selected in step 114' determines the bit that can be used in testing the key. The column selected in step 114' is the column which has the minimum number of boundary symbols and wildcards or which has the maximum number of binary symbols. If more than one column has the same minimum number of boundary symbols and wildcards, then the column having the lowest index is selected in step 114'.

The bit corresponding to the selected column is provided for use in the decision tree, via step 116'. In a preferred embodiment, the bit is provided to the switch 18' or 26'. The first time that the step 116' is performed, the first node for the decision tree to be used for the plurality of filter rules is provided. Subsequent bits provided for subsequent nodes depend upon the submatrix from which the column is selected. Preferably, a bit from the first submatrix, discussed below, is provided to one side of the node, while a bit from the second submatrix, discussed below, is provided to the opposite side of the node. Subsequent bits for subsequent nodes are provided to opposite sides of a previous node.

Two submatrices are provided from the matrix, via step 118'. The two submatrices are provided based on the entry each rule has in the selected column. The first submatrix includes a wildcard in the selected column for a filter rule having a zero in the selected column. The first submatrix does not include filter rules which have a one in the selected column. The first submatrix includes unchanged filter rules which have a wildcard or a boundary symbol in the selected column. Thus, the first submatrix is preferably used in providing the bits for branches from a node which are taken if the bit in the key corresponding to the node is a zero. The second submatrix includes a wildcard in the selected column for a filter rule having a one in the selected column. The second submatrix does not include filter rules which have a zero in the selected column. The second submatrix includes unchanged filter rules which have a wildcard or a boundary symbol in the selected column. Thus, the second submatrix is preferably used in providing the bits for branches from a node which are taken if the bit in the key corresponding to the node is nonzero.

Certain duplicate rows corresponding to rows of the same type, if any, having a lower priority are eliminated from the first and second matrices, via step 119. Step 119 removes a filter having a lower priority which is the duplicate of a higher priority filter rule if neither filter rule has a boundary symbol within it and if both filter rules are in the same block (type). This elimination is possible because if the two rules are identical and fit the above criteria, the higher priority rule will always control.

The steps of selecting a column (step 114'), providing the bit (step 116'), generating submatrices (step 118') and deleting duplicate columns (step 119) are then repeated for the submatrices previously generated, via step 120'. Step 120' repeats steps 114', 116', 118' and 119 until none of the columns in the submatrices generated have a binary symbol, i.e. a zero or a one. In a preferred embodiment, a bit corresponding to a columns selected in the first submatrix is provided on a left branch from a current node using step 116'. Similarly, a bit corresponding to a column selected from the second submatrix is provided on a right branch from the current node using step 116'. Thus, a decision tree can be completed using step 120'.

Once the decision tree is completed in step 120', the decision tree is further optimized. Any duplicate subtrees within the decision tree are located and replaced with pointers, via step 122. Thus, in step 122 the duplicate subtrees are eliminated, leaving only a single copy of the subtree. In place of the duplicate subtrees, a pointer from a previous node which would branch to the duplicate subtree is provided. The pointer points from the previous node to a node which is the starting node for the single copy of the subtree. Thus, the size of the decision tree is reduced.

Thus, the desired binary decision tree can be provided using the method 110'. Using the method 110', the bits which can be used to test the key against are determined and the desired decision tree constructed. Thus, the resultant of the method 110' is a binary decision tree which can be used to test certain bits of keys for packets. As a result, the method 100 can be used to substantially reduce the time required to test filter rules. Furthermore, because duplicate subtrees are removed, space is saved in forming the decision tree. Consequently, not only is time saved, but storage cost for the decision tree is also reduced. In addition, when the method 110' is performed by the control point 15 or 27, the switch 18' or 26' performs the rapid testing of the packet, while the control point 15 or 27 performs the more complex, slower calculations relating to the matrices.

In order to more completely explain the methods 100, 110 and 110', the following example is used. The example might arise after exhaustion of some other search algorithm, eliminating all but eight rules by testing bits not shown in Table 1, below. Suppose that the eight remaining rules are R0 through R7. The rules, listed by action type and from highest to lowest priority are depicted in Table 1.

TABLE 1

| Rule | Bit x5 | Bit x4 | Bit x3 | Bit x2 | Bit x1 | Bit x0 | Action |
|------|--------|--------|--------|--------|--------|--------|--------|
|      |        |        |        |        |        |        | Permit/ Deny |
| R0   | 0      | 1      | 0      | 0      | 1      | 0      | Deny   |
| R1   | 0      | 1      | 0      | 0      | *      | *      | Permit |

TABLE 1-continued

| Rule | Bit x5 | Bit x4 | Bit x3 | Bit x2 | Bit x1 | Bit x0 | Action |
|------|--------|--------|--------|--------|--------|--------|--------|
| R2 | 0 | 1 | * | * | * | * | Deny |
| R3 | * | * | * | * | * | * | Permit QoS |
| R4 | b | b | * | * | 1 | 0 | 1 |
| R5 | 0 | * | 0 | 0 | b | b | 2 |
| R6 | * | * | * | 0 | 1 | 0 | 3 |
| R7 | * | * | * | * | * | * | 4 |

Thus, the filter rules in this example can be described using a six-bit number. Thus, the portion of the key which may be used includes six bits. For example, if the key has different fields, then a field of the key is six bits and the rules R0 through R7 have the ranges depicted in Table 1 for the field. There are also two action types shown in Table 1, permit/deny and quality of service.

Using the method 110 or 110', a decision tree can be built. In order to provide such a tree, a matrix for rules R0 through R7 is provided. A matrix for the filter rules R0 through R7 would include the bits x0 through x5 for each of the filter rules. The matrix, M, provided is:

$$M = \begin{array}{c} \\ R0 \\ R1 \\ R2 \\ R3 \\ \\ R4 \\ R5 \\ R6 \\ R7 \end{array} \begin{array}{cccccc} x5 & x4 & x3 & x2 & x1 & x0 \\ 0 & 1 & 0 & 0 & 1 & 0 \\ 0 & 1 & 0 & 0 & * & * \\ 0 & 1 & * & * & * & * \\ * & * & * & * & * & * \\ b & b & * & * & 1 & 0 \\ 0 & * & 0 & 0 & b & b \\ * & * & * & 0 & 1 & 0 \\ * & * & * & * & * & * \end{array}$$

As can be seen, none of the columns of the matrix M have both zeroes and ones. Thus, the filter rules R0 through R7 fit the preferred criteria for using the method 100, 110 and 110'. A column is selected from the matrix M by determining for which column the sum of the number of wildcards and boundary symbols is the smallest. Columns corresponding to bits x2 and x5 have the minimum number of wildcards and boundary symbols, four. Since the index number for the column corresponding to x2 is lower, x2 is selected as the first column. Thus, the first bit to be tested and the first node in the binary tree correspond to x2.

The first and second matrices are then derived from M. The first matrix, M0, is provided as described in steps 118 and 118'. The first matrix M0 is:

$$M0 = \begin{array}{c} \\ R0 \\ R1 \\ R2 \\ R3 \\ \\ R4 \\ R5 \\ R6 \\ R7 \end{array} \begin{array}{cccccc} x5 & x4 & x3 & x2 & x1 & x0 \\ 0 & 1 & 0 & * & 1 & 0 \\ 0 & 1 & 0 & * & * & * \\ 0 & 1 & * & * & * & * \\ * & * & * & * & * & * \\ b & b & * & * & 1 & 0 \\ 0 & * & 0 & * & b & b \\ * & * & * & * & 1 & 0 \\ * & * & * & * & * & * \end{array}$$

Note that no rows in M0 are duplicates of rows in the same block having a higher priority. Thus, no rows are deleted from M0. The second matrix, M1, is also provided as described in the steps 118 and 118'. The second matrix is:

$$M1 = \begin{array}{c} \\ R2 \\ R3 \\ \\ R4 \\ R7 \end{array} \begin{array}{cccccc} x5 & x4 & x3 & x2 & x1 & x0 \\ 0 & 1 & * & * & * & * \\ * & * & * & * & * & * \\ b & b & * & * & 1 & 0 \\ * & * & * & * & * & * \end{array}$$

There are no duplicate rows not having any boundary symbols in the second matrix M1. Consequently, no rows can be deleted from M1. The first matrix, M0 is used to determine the left branch from the first node in the preferred embodiment of the decision tree being built. The left branch is the branch taken if the bit being tested at the first node is a zero. The second matrix, M1 is used to determine the right branch from the first node in the preferred embodiment of the decision tree being built. The right branch is taken if the bit being tested is nonzero.

Steps 114 through 120 or 114' through 120' are then repeated for the first and second submatrices, M0 and M1. The column selected from M0 corresponds to bit x5 because it is this column that has the smallest number of wildcards and boundary symbols. Two additional submatrices are generated from M0 when step 118 is repeated for M0. A first submatrix, M00 for x5=0, is used to determine the nodes branching to the left of the node corresponding to x5, which occurs when x5 is zero. The second submatrix, M01 for x5=1, determines the nodes branching to the right of the node corresponding to x5, which occurs when x5 is not zero. Similarly, the column selected from M1 corresponds to the bit x1. These two submatrices are:

$$M00 = \begin{array}{c} \\ R0 \\ R1 \\ R2 \\ R3 \\ \\ R4 \\ R5 \\ R6 \\ R7 \end{array} \begin{array}{cccccc} x5 & x4 & x3 & x2 & x1 & x0 \\ * & 1 & 0 & * & 1 & 0 \\ * & 1 & 0 & * & * & * \\ * & 1 & * & * & * & * \\ * & * & * & * & * & * \\ b & b & * & * & 1 & 0 \\ * & * & 0 & * & b & b \\ * & * & * & 0 & 1 & 0 \\ * & * & * & * & * & * \end{array}$$

and $$M01 = \begin{array}{c} R3 \\ \\ R4 \\ R6 \\ R7 \end{array} \begin{array}{cccccc} x5 & x4 & x3 & x2 & x1 & x0 \\ * & * & * & * & * & * \\ b & b & * & * & 1 & 0 \\ * & * & * & 0 & 1 & 0 \\ * & * & * & * & * & * \end{array}$$

This process is continued through the left branch of the tree (where x2=0, using M0 as the first submatrix) until no columns in the submatrices generated contain zeroes or ones. Following the M0 side of the tree, for M00, the column selected is x0. The submatrices obtained from M00 for x0=0 and 1 are M000 and M00, respectively. These submatrices are:

$$M000 = \begin{array}{c|cccccc} & x5 & x4 & x3 & x2 & x1 & x0 \\ R0 & * & 1 & 0 & * & 1 & * \\ R1 & * & 1 & 0 & * & * & * \\ R2 & * & 1 & * & * & * & * \\ R3 & * & * & * & * & * & * \\ \\ R4 & b & b & * & * & 1 & 0 \\ R5 & * & * & 0 & * & b & b \\ R6 & * & * & * & * & 1 & * \\ R7 & * & * & * & * & * & * \end{array}$$

$$M001 = \begin{array}{c|cccccc} & x5 & x4 & x3 & x2 & x1 & x0 \\ R1 & * & 1 & 0 & * & * & * \\ R2 & * & 1 & * & * & * & * \\ R3 & * & * & * & * & * & * \\ \\ R5 & * & * & 0 & 0 & b & b \\ R7 & * & * & * & * & * & * \end{array}$$

From M000, two submatrices are obtained after column x1 is selected are M0000 and M0001 for x1 equal to zero and one, respectively. These submatrices are:

From the submatrix M0000, column x3 is selected because this is the lowest index column having the fewest wildcards or boundary symbols. The submatrices M00000 and M00001 are generated for x3 equal to zero and one, respectively. These submatrices are:

The column selected for M001 is column x3. The submatrices M0010 and M0011 for x3 equal to zero and one, respectively. These submatrices M0010 and M0011 are:

Two additional submatrices, M10 and M11, are generated from M1 when step 118 is repeated. A first submatrix, M10, is used to determine the nodes branching to the left of the node corresponding to x1, which occurs when x1 is zero. The second submatrix, M11, determines the nodes branching to the right of the node corresponding to x1, which occurs when x1 is not zero. These two submatrices are:

This process is repeated until all columns of the submatrices generated are either wild cards or boundary symbols. Consequently, the bits which may be used in testing can be determined.

Figure 6:
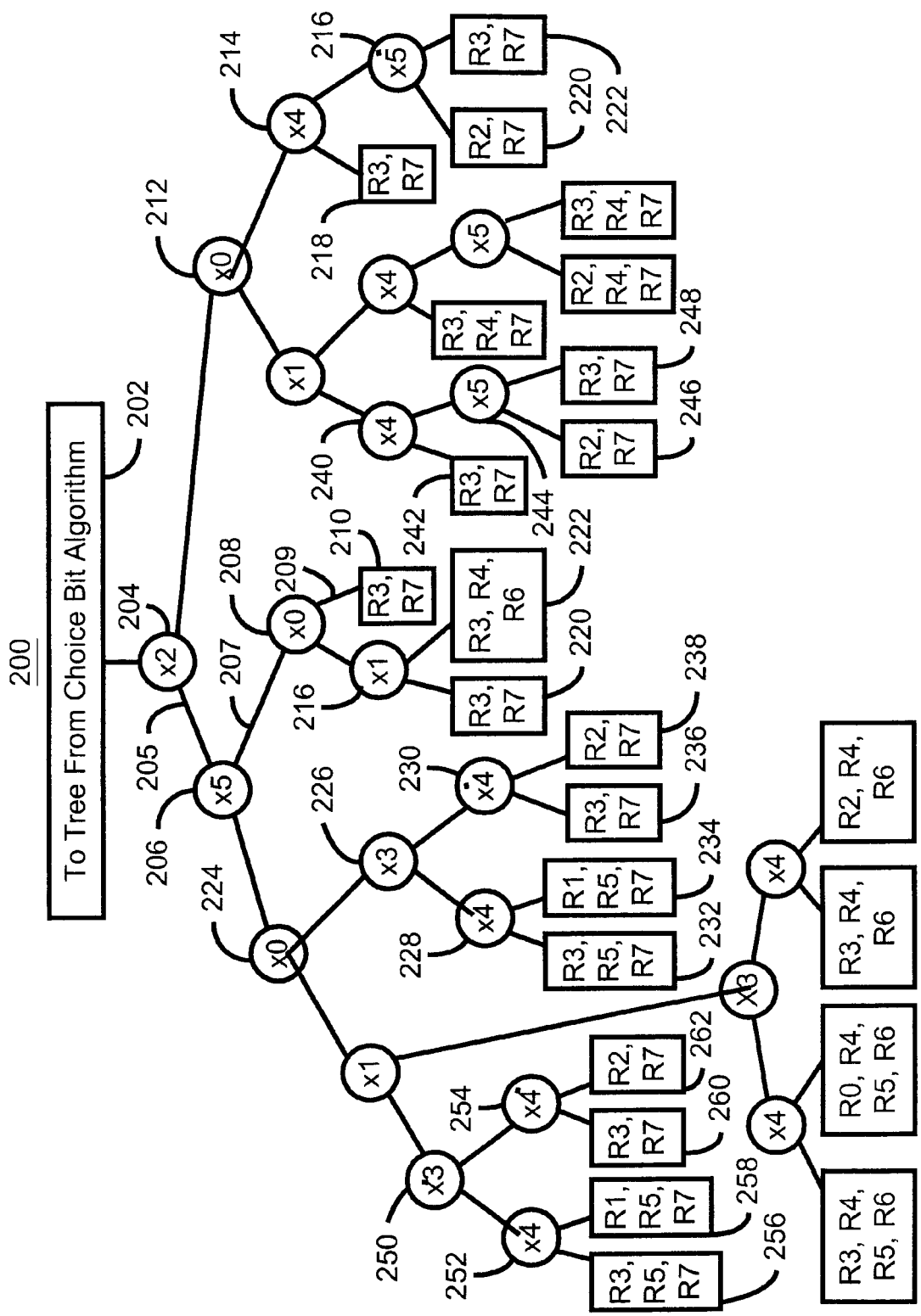
FIG. 6 is a diagram of an example of a portion of a particular decision tree in accordance with the present invention.

FIG. 6 depicts a tree 200 generated in accordance with the methods 110 and 110' and which can be used in performing the method 100. The tree 200 can be coupled via branch 202 to a tree generated using the choice bit algorithm. Alternatively, the tree 200 can stand alone. Using the tree 200, the method 100 can be performed. For example, suppose that the value of the key for a particular packet is 101001. By explicitly testing the key, it can be determined that the key can match only rules R3 and R7. Using the binary tree 200 and the method 100, the same conclusion can be rapidly reached. The bits having the lowest number of wildcards and boundary symbols at each node have previously been determined when the decision tree 200 was formed. Thus, by testing the bits at the appropriate nodes in the tree 200, the method 100 will be performed. The first bit to be tested is bit x2. The bit x2 or the key is a zero. Thus, testing the bit x2 for the key at the node 204 indicates that the left branch 205 should be taken. Testing the bit x5 for the key, which is 1, at the node 206 indicates that the right branch 207 should be taken. Testing the bit x0 of the key, which is a one, at the node 208 indicates that the right branch 209 should be taken. This leads to leaf 210, which indicates that the key 101001 can only match rules R3 and R7. This conclusion was reached by testing the values of only three bits of the key and using the method 100. Thus, the method 100 in conjunction with the binary tree 200 can rapidly and easily determine the filter rules which a key can match. The key may then be tested explicitly against these filter rules.

Figure 7:
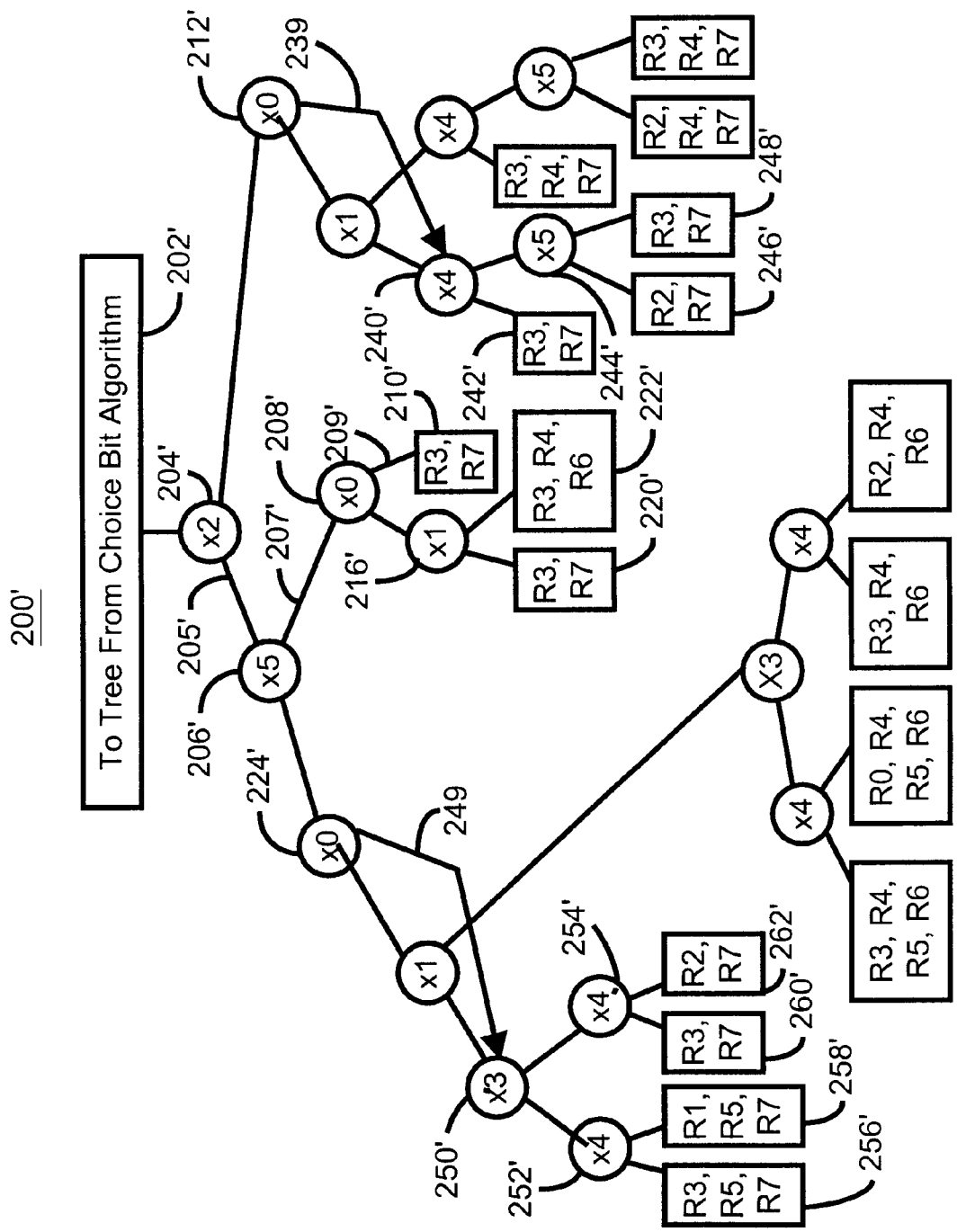
FIG. 7 is a diagram of an example of a portion of a particular decision tree in accordance with a preferred embodiment of the present invention.
Figure 8:
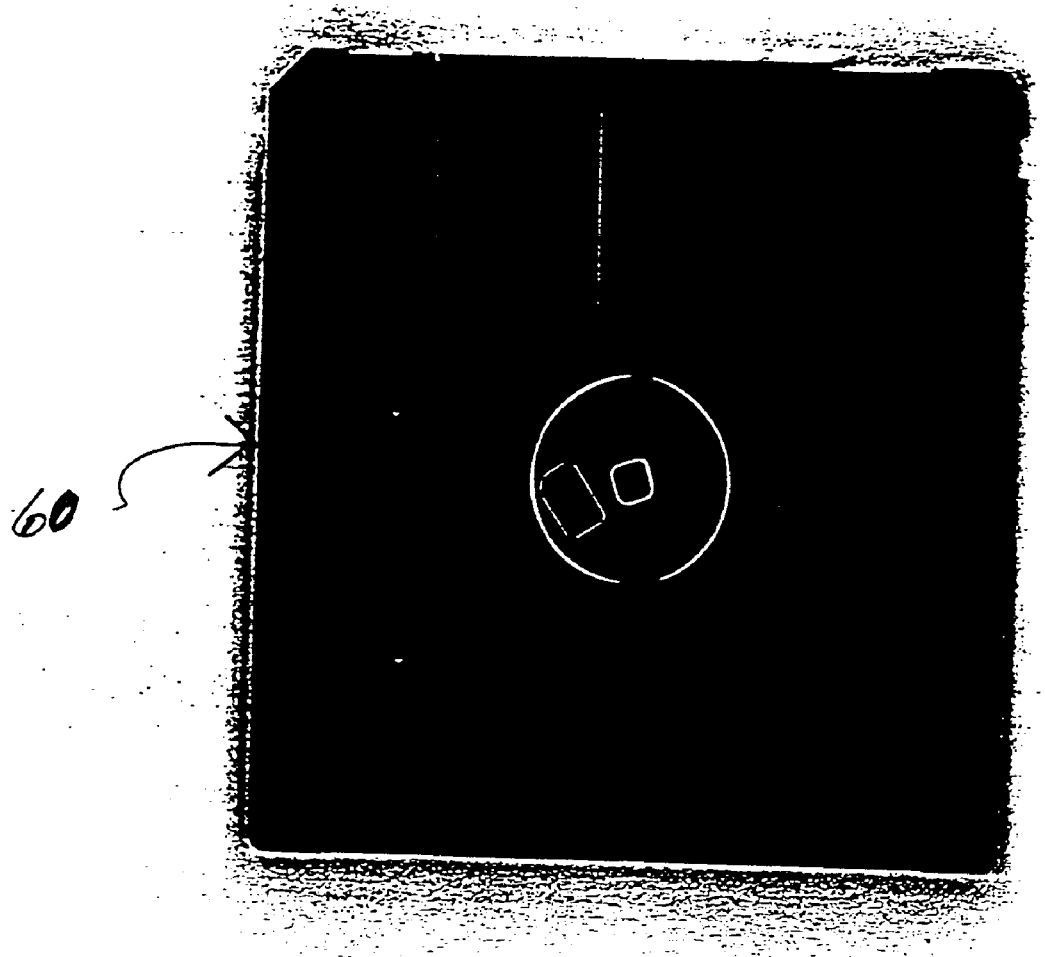
FIG. 8 shows an example of a diskette on which the computer program can be recorded.

The decision tree 200 can also be further optimized using the step 122 for the method 110'. FIG. 7 depicts a decision tree 200' which has been so optimized. Referring to FIG. 6 the subtrees starting at nodes 214 and 226 are duplicated by the subtrees at nodes 240 and 250, respectively. Thus, the nodes 214 and 216 and leaves 218, 220 and 222 are a copy of the nodes 240 and 244 and leaves 242, 246 and 248. The nodes 226, 228 and 230 and leaves 232, 234, 236 and 238 are a copy of the nodes 250, 252 and 254 and leaves 256, 258, 260 and 262.

Referring back to FIG. 7, these subtrees starting at nodes 214 and 226 have been removed. In their places, pointers 239 and 249 have been provided. The pointers 239 and 249 point from the previous node 232' and 224', respectively, to the nodes 240' and 250'. Thus, additional space is saved in implementing the decision tree 200'. Note that although all duplicate subtrees have been replaced in the tree 200', nothing prevent replacing only some or none of the subtrees with pointers or similar tools. However, more space is saved by replacing a greater number of duplicate subtrees.

Thus, using the methods 100, 110 and 110', decision trees can be provided and filter rules, particularly those having different action types, can be easily and rapidly tested. Furthermore, the decision trees themselves can be improved to reduce the space occupied by redundant portions of the decision trees. Thus, transmission of packets of the networks 10' and 20' can be facilitated.

A method and system has been disclosed for testing filter rules that use ranges of values. Software written according to the present invention is to be stored in some form of computer-readable medium, such as memory, CD-ROM, diskette 60 or transmitted over a network, and executed by a processor. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for testing a plurality of filter rules in a computer system, the plurality of filter rules being used with a key, each of the plurality of filter rules capable of being described using a plurality of bits, the plurality of bits capable of including at least one binary value, at least one wildcard, and at least one boundary symbol, the at least one binary value of a filter rule of the plurality of filter rules capable of being a zero or a one, the plurality of bits corresponding to a portion of the key, the method comprising the steps of:

(a) selecting a portion of the plurality of filter rules that the key can match by testing the key against a portion of the plurality of bits, a first bit of the portion of the plurality of bits having a first maximum number of the at least one binary symbol for the plurality of filter rules, each subsequent bit of the portion plurality of bits having a second maximum number of the at least one binary symbol for a plurality of remaining bits and being selected based on testing of a prior bit of the portion of the plurality of bits; and (b) testing the portion of the plurality of rules against the key.

2. The method of claim 1 wherein the selecting step (a) further includes the step of:
   (a1) selecting the portion of the plurality of filter rules that the key can match using a decision tree and the portion of the plurality of bits, the decision tree including a plurality of nodes and a plurality of leaves, the portion of the plurality of filter rules being on at least one leaf of the plurality of leaves, a first node of the plurality of nodes corresponding to the first bit of the plurality of bits for each of the plurality of filter rules, the first bit having a first maximum number of the at least one binary symbol for the plurality of filter rules, each subsequent node of the plurality of nodes corresponding to a bit of a second plurality of remaining bits for each of the plurality of filter rules, the bit having a second maximum number of the at least one binary symbol for the plurality of remaining bits.

3. The method of claim 2 wherein the method further includes the step of:
   (c) providing the decision tree, the decision tree providing step including the steps of:
      (c1) providing a first matrix having a plurality of rows and a plurality of columns, each of the plurality of rows corresponding to a filter rule of the plurality of filter rules, each of the plurality of columns corresponding to a bit of the plurality of bits for the plurality of filter rules;
      (c2) providing a first node of the plurality of nodes using the first bit of the plurality of bits, the first bit corresponding to a column of the first matrix that has the first maximum number of the at least one binary symbols for the plurality of filter rules;
      (c3) providing a second matrix based on the first matrix, the second matrix including a wildcard for an entry in the column if the entry is a zero and excluding a row of the first matrix if the entry in the column for the row is a one;
      (c4) providing a third matrix based on the first matrix, the third matrix including a wildcard for an entry in the column if the entry is a one and excluding a row of the first matrix if the entry in the column for the row is a zero;
      (c5) repeating steps (c2) through (c4) for each of the second matrix and the third matrix until the plurality of nodes is provided.

4. The method of claim 3 wherein the first matrix providing step further includes the step of:
   (c1i) ranking the plurality of filter rules based on a priority of each of the plurality of filter rules.

5. The method of claim 3 wherein the first matrix providing step further includes the step of:
   (c1i) ranking the plurality of filter rules based on a type of each of the plurality of filter rules.

6. The method of claim 3 wherein the first matrix providing step further includes the step of:
   (c1i) ranking the plurality of filter rules based on a type of each of the plurality of filter rules and a priority of each of the plurality of filter rules.

7. The method of claim 3 wherein the first, second and third matrix are capable of having a pair of duplicate rows having a same type, a first row of the pair of duplicate rows having a higher priority, a second row of the pair of duplicate rows having a lower priority, neither row of the pair of duplicate rows having a boundary symbol, the first matrix, second matrix and third matrix further being provided by removing the second row.

8. The method of claim 1 wherein the key further includes a plurality of fields and wherein the plurality of bits for each of the plurality of filter rules corresponds to a field of the plurality of fields.

9. The method of claim 8 wherein the plurality of filter rules are further described by a second plurality of bits corresponding to remaining fields of the plurality of fields, and wherein the method further includes the steps of:
   (c) repeating steps (a) and (b) for the remaining fields of the plurality of fields using a portion of the second plurality of bits.

10. The method of claim 3 wherein the decision tree includes at least one pointer from at least one particular node of the plurality of nodes to at least a starting node of at least one subtree, thereby allowing the at least one subtree to be utilized for more than a single node.

11. The method of claim 1 wherein the plurality of filter rules can be of a plurality of types.

12. A method for providing a decision tree for testing a plurality of filter rules in a computer system, the decision tree including a plurality of nodes and a plurality of leaves, the plurality of filter rules being used with a key, each of the plurality of filter rules capable of being described using a plurality of bits, the plurality of bits capable of including at least one binary value, at least one wildcard, and at least one boundary symbol, the at least one binary value of a filter rule of the plurality of filter rules capable of being a zero or a one, the plurality of bits corresponding to a portion of the key, the method comprising the steps of:
   (a) providing a first matrix having a plurality of rows and a plurality of columns, each of the plurality of rows corresponding to a filter rule of the plurality of filter rules, each of the plurality of columns corresponding to a bit of the plurality of bits for the plurality of filter rules;
   (b) providing a first node of the plurality of nodes using a first bit of the plurality of bits, the first bit corresponding to a column of the first matrix that has a first maximum number of the at least one binary symbols for the plurality of filter rules;
   (c) providing a second matrix based on the first matrix, the second matrix including a wildcard for an entry in the column if the entry is a zero and excluding a row of the first matrix if the entry in the column for the row is a one;
   (d) providing a third matrix based on the first matrix, the third matrix including a wildcard for an entry in the column if the entry is a one and excluding a row of the first matrix if the entry in the column for the row is a zero;
   (e) repeating steps (b) through (d) for each of the second matrix and the third matrix until the plurality of nodes is provided.

13. The method of claim 12 wherein the first matrix providing step further includes the step of:
   (a1) ranking the plurality of filter rules based on a priority of each of the plurality of filter rules.

14. The method of claim 12 wherein the first matrix providing step further includes the step of:
   (a2) ranking the plurality of filter rules based on a type of each of the plurality of filter rules.

15. The method of claim 12 wherein the first matrix providing step further includes the step of:
   (a3) ranking the plurality of filter rules based on a type of each of the plurality of filter rules and a priority of each of the plurality of filter rules.

16. The method of claim 12 wherein the first, second and third matrix are capable of having a pair of duplicate rows having a same type, a first row of the pair of duplicate rows having a higher priority, a second row of the pair of duplicate rows having a lower priority, neither row of the pair of duplicate rows having a boundary symbol, the first matrix, second matrix and third matrix further being provided by removing the second row.

17. The method of claim 13 wherein the key further includes a plurality of fields and wherein the plurality of bits for each of the plurality of filter rules corresponds to a field of the plurality of fields.

18. The method of claim 17 wherein the plurality of filter rules are further described by a second plurality of bits corresponding to remaining fields of the plurality of fields, and wherein the method further includes the steps of:
   (f) repeating steps (a) through (e) for the remaining fields of the plurality of fields using a portion of the second plurality of bits, thereby providing a plurality of decision trees for the plurality of fields.

19. The method of claim 12 further comprising the step of:
   (f) replacing at least one particular subtree with at least one pointer from at least one particular node of the at least one particular subtree to at least a starting node of at least one other subtree, thereby allowing the at least one other subtree to be utilized in place of the at least one particular subtree.

20. A computer-readable medium including a program for testing a plurality of filter rules in a computer system, the plurality of filter rules being used with a key, each of the plurality of filter rules capable of being described using a plurality of bits, the plurality of bits capable of including at least one binary value, at least one wildcard, and at least one boundary symbol, the at least one binary value of a filter rule of the plurality of filter rules capable of being a zero or a one, the plurality of bits corresponding to a portion of the key, the program including instructions for:
   (a) selecting a portion of the plurality of filter rules that the key can match by testing the key against a portion of the plurality of bits, a first bit of the portion of the plurality of bits having a first maximum number of the at least one binary symbol for the plurality of filter rules, each subsequent bit of the portion plurality of bits having a second maximum number of the at least one binary symbol for a plurality of remaining bits and being selected based on testing of a prior bit of the portion of the plurality of bits; and
   (b) testing the portion of the plurality of rules against the key.

21. The computer-readable medium of claim 20 wherein the selecting instructions (a) further includes instructions for:
   (a1) selecting the portion of the plurality of filter rules that the key can match using a decision tree and the portion of the plurality of bits, the decision tree including a plurality of nodes and a plurality of leaves, the portion of the plurality of filter rules being on at least one leaf of the plurality of leaves, a first node of the plurality of nodes corresponding to the first bit of the plurality of bits for each of the plurality of filter rules, the first bit having a first maximum number of the at least one binary symbol for the plurality of filter rules, each subsequent node of the plurality of nodes corresponding to a bit of a second plurality of remaining bits for each of the plurality of filter rules, the bit having a second maximum number of the at least one binary symbol for the plurality of remaining bits.

22. The computer-readable medium of claim 21 wherein the program further includes instructions for:
   (c) providing the decision tree, the decision tree providing instruction including instructions for:
      (c1) providing a first matrix having a plurality of rows and a plurality of columns, each of the plurality of rows corresponding to a filter rule of the plurality of filter rules, each of the plurality of columns corresponding to a bit of the plurality of bits for the plurality of filter rules;
      (c2) providing a first node of the plurality of nodes using the first bit of the plurality of bits, the first bit corresponding to a column of the first matrix that has the first maximum number of the at least one binary symbols for the plurality of filter rules;
      (c3) providing a second matrix based on the first matrix, the second matrix including a wildcard for an entry in the column if the entry is a zero and excluding a row of the first matrix if the entry in the column for the row is a one;
      (c4) providing a third matrix based on the first matrix, the third matrix including a wildcard for an entry in the column if the entry is a one and excluding a row of the first matrix if the entry in the column for the row is a zero;
      (c5) repeating instructions (c2) through (c4) for each of the second matrix and the third matrix until the plurality of nodes are provided.

23. The computer-readable medium of claim 22 wherein the first matrix providing step further includes instructions for:
   (c1i) ranking the plurality of filter rules based on a priority of each of the plurality of filter rules.

24. The computer-readable medium of claim 22 wherein the first matrix providing step further includes instructions for:
   (c1i) ranking the plurality of filter rules based on a type of each of the plurality of filter rules.

25. The computer-readable medium of claim 22 wherein the first matrix providing step further includes instructions for:
   (c1i) ranking the plurality of filter rules based on a type of each of the plurality of filter rules and a priority of each of the plurality of filter rules.

26. The computer-readable medium of claim 22 wherein the decision tree includes at least one pointer from at least one particular node of the plurality of nodes to at least a starting node of at least one subtree, thereby allowing the at least one subtree to be utilized for more than a single node.

27. A computer-readable medium containing a program for providing a decision tree for testing a plurality of filter rules in a computer system, the decision tree including a plurality of nodes and a plurality of leaves, the plurality of filter rules being used with a key, each of the plurality of filter rules capable of being described using a plurality of bits, the plurality of bits capable of including at least one binary value, at least one wildcard, and at least one boundary symbol, the at least one binary value of a filter rule of the plurality of filter rules capable of being a zero or a one, the plurality of bits corresponding to a portion of the key, the program including instructions for:
   (a) providing a first matrix having a plurality of rows and a plurality of columns, each of the plurality of rows corresponding to a filter rule of the plurality of filter rules, each of the plurality of columns corresponding to a bit of the plurality of bits for the plurality of filter rules;

(b) providing a first node of the plurality of nodes using a first bit of the plurality of bits, the first bit corresponding to a column of the first matrix that has a first maximum number of the at least one binary symbols for the plurality of filter rules;

(c) providing a second matrix based on the first matrix, the second matrix including a wildcard for an entry in the column if the entry is a zero and excluding a row of the first matrix if the entry in the column for the row is a one;

(d) providing a third matrix based on the first matrix, the third matrix including a wildcard for an entry in the column if the entry is a one and excluding a row of the first matrix if the entry in the column for the row is a zero;

(e) repeating steps (b) through (d) for each of the second matrix and the third matrix until the plurality of nodes is provided.

28. A system for testing a plurality of filter rules in a computer system, A method for testing a plurality of filter rules in a computer system, the plurality of filter rules being used with a key, each of the plurality of filter rules capable of being described using a plurality of bits, the plurality of bits capable of including at least one binary value, at least one wildcard, and at least one boundary symbol, the at least one binary value of a filter rule of the plurality of filter rules capable of being a zero or a one, the plurality of bits corresponding to a portion of the key, the system comprising:

a plurality of hosts for transmitting and receiving data;

a switch for selecting a portion of the plurality of filter rules that the key can match by testing the key against a portion of the plurality of bits, a first bit of the portion of the plurality of bits having a first maximum number of the at least one binary symbol for the plurality of filter rules, each subsequent bit of the portion plurality of bits having a second maximum number of the at least one binary symbol for a plurality of remaining bits and being selected based on testing of a prior bit of the portion of the plurality of bits and for testing the portion of the plurality of rules against the key.

29. The system of claim 28 wherein the switch includes:

a decision tree, the decision tree including a plurality of nodes and a plurality of leaves, the portion of the plurality of filter rules being on at least one leaf of the plurality of leaves, a first node of the plurality of nodes corresponding to the first bit of the plurality of bits for each of the plurality of filter rules, the first bit having a first maximum number of the at least one binary symbol for the plurality of filter rules, each subsequent node of the plurality of nodes corresponding to a bit of a second plurality of remaining bits for each of the plurality of filter rules, the bit having a second maximum number of the at least one binary symbol for the plurality of remaining bits.

30. The system of claim 29 further comprising:

a control point for providing the decision tree, the decision tree being provided by providing a first matrix having a plurality of rows and a plurality of columns, each of the plurality of rows corresponding to a filter rule of the plurality of filter rules, each of the plurality of columns corresponding to a bit of the plurality of bits for the plurality of filter rules, providing a first node of the plurality of nodes using the first bit of the plurality of bits, the first bit corresponding to a column of the first matrix that has the first maximum number of the at least one binary symbols for the plurality of filter rules, providing a second matrix based on the first matrix, the second matrix including a wildcard for an entry in the column if the entry is a zero and excluding a row of the first matrix if the entry in the column for the row is a one, providing a third matrix based on the first matrix, the third matrix including a wildcard for an entry in the column if the entry is a one zero and excluding a row of the first matrix if the entry in the column for the row is a zero and repeating the steps of selecting the columns, providing a node, providing the second matrix and providing the third matrix for the second and third matrices until the portion of the plurality of rules can be isolated on the decision tree.

31. The system of claim 30 wherein the first matrix is provided by ranking the plurality of filter rules based on a priority of each of the plurality of filter rules.

32. The system of claim 30 wherein the first matrix is provided by ranking the plurality of filter rules based on a type of each of the plurality of filter rules.

33. The system of claim 30 wherein the first matrix is provided by ranking the plurality of filter rules based on a type of each of the plurality of filter rules and a priority of each of the plurality of filter rules.

34. The system of claim 30 wherein the first, second and third matrix are capable of having a pair of duplicate rows having a same type, a first row of the pair of duplicate rows having a higher priority, a second row of the pair of duplicate rows having a lower priority, neither row of the pair of duplicate rows having a boundary symbol, the first matrix, second matrix and third matrix further being provided by removing the second row.

35. The system of claim 28 wherein the key further includes a plurality of fields and wherein the plurality of bits for each of the plurality of filter rules corresponds to a field of the plurality of fields.

36. The system of claim 35 wherein the plurality of filter rules are further described by a second plurality of bits corresponding to remaining fields of the plurality of fields, and wherein the switch repeats the selection of the portion of the plurality of filter rules and the testing of the portion of the plurality of filter rules for the remaining fields of the plurality of fields using a portion of the second plurality of bits.

37. The system of claim 30 wherein the decision tree includes at least one pointer from at least one particular node of the plurality of nodes to at least a starting node of at least one subtree, thereby allowing the at least one subtree to be utilized for more than a single node.

38. The system of claim 29 wherein the plurality of filter rules can be of a plurality of types.

39. A system for testing a plurality of filter rules in a computer system, the plurality of filter rules being used with a key, each of the plurality of filter rules capable of being described using a plurality of bits, the plurality of bits capable of including at least one binary value, at least one wildcard, and at least one boundary symbol, the at least one binary value of a filter rule of the plurality of filter rules capable of being a zero or a one, the plurality of bits corresponding to a portion of the key, the system comprising:

a plurality of hosts for transmitting and receiving data;

a control point for providing a decision tree; and logic coupled with the plurality of hosts and the control point for testing the plurality of filter rules, the logic including the decision tree having a plurality of nodes and a plurality of leaves, the decision tree being provided by providing a first matrix having a plurality of rows and a plurality of columns, each of the plurality of rows corresponding to a filter rule of the plurality of filter rules, each of the plurality of columns corresponding to a bit of the plurality of bits for the plurality of filter rules, providing a first node of the plurality of nodes using a first bit of the plurality of bits, the first bit corresponding to a column of the first matrix that has a first maximum number of the at least one binary symbols for the plurality of filter rules, providing a second matrix based on the first matrix, the second matrix including a wildcard for an entry in the column if the entry is a zero and excluding a row of the first matrix if the entry in the column for the row is a one, providing a third matrix based on the first matrix, the third matrix including a wildcard for an entry in the column if the entry is a one zero and excluding a row of the first matrix if the entry in the column for the row is a zero and repeating the column selecting, second matrix providing and third matrix providing steps for the second and third matrix to provide a plurality of remaining nodes for the decision tree.

40. The system of claim 39 wherein the first matrix is provided by ranking the plurality of filter rules based on a priority of each of the plurality of filter rules.

41. The system of claim 39 wherein the first matrix is provided by ranking the plurality of filter rules based on a type of each of the plurality of filter rules.

42. The system of claim 39 wherein the first matrix is provided by ranking the plurality of filter rules based on a type of each of the plurality of filter rules and a priority of each of the plurality of filter rules.

43. The system of claim 39 wherein the key further includes a plurality of fields and wherein the plurality of bits for each of the plurality of filter rules corresponds to a field of the plurality of fields.

44. The system of claim 39 wherein the first, second and third matrix are capable of having a pair of duplicate rows having a same type, a first row of the pair of duplicate rows having a higher priority, a second row of the pair of duplicate rows having a lower priority, neither row of the pair of duplicate rows having a boundary symbol, the first matrix, second matrix and third matrix further being provided by removing the second row.

45. The system of claim 39 wherein the decision tree is further formed by replacing at least one particular subtree with at least one pointer from at least one particular node of the at least one particular subtree to at least a starting node of at least one other subtree, thereby allowing the at least one other subtree to be utilized in place of the at least one particular subtree.

\* \* \* \* \*